H. L. HAPPER.
MEAT ROASTER.
APPLICATION FILED AUG. 16, 1913. RENEWED FEB. 21, 1916.
1,245,711.
Patented Nov. 6, 1917.
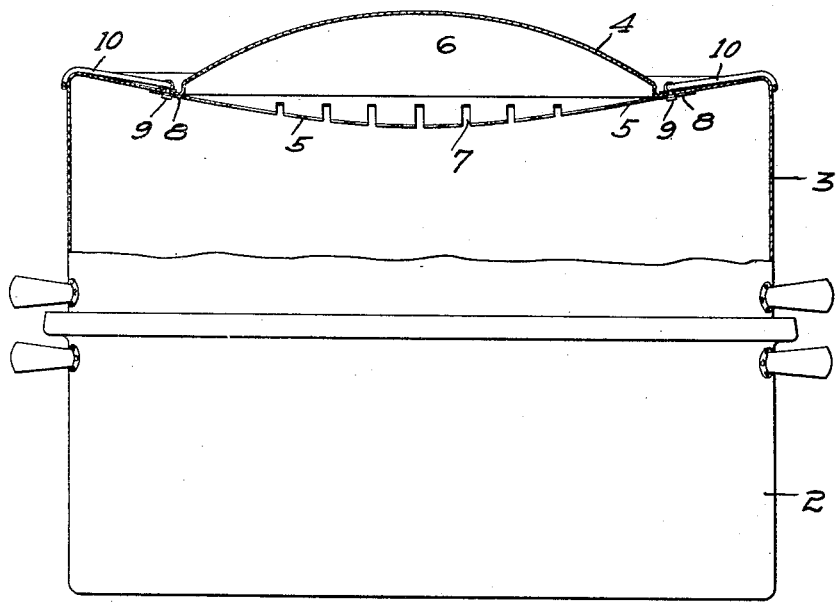
FIG.1.
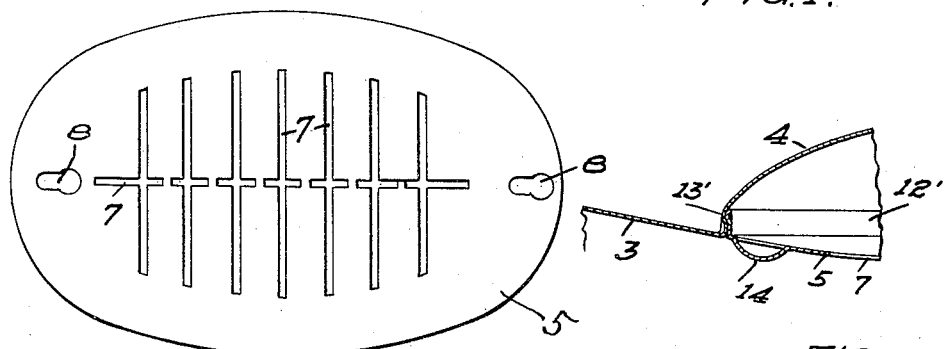
FIG.2.
FIG.5.
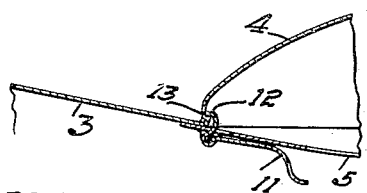
FIG.4.
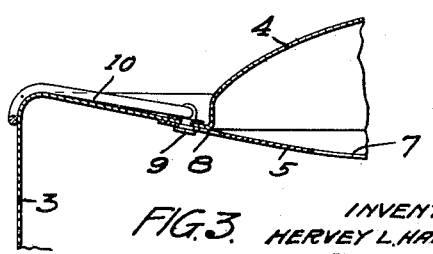
FIG.3.
WITNESSES
INVENTOR
HERVEY L. HAPPER
BY
ATTORNEYS

UNITED STATES PATENT OFFICE.

HERVEY L. HAPPER, OF MINNEAPOLIS, MINNESOTA.

MEAT-ROASTER.

1,245,711. Specification of Letters Patent. Patented Nov. 6, 1917.

Application filed August 16, 1913, Serial No. 785,048. Renewed February 21, 1916. Serial No. 79,801.

*To all whom it may concern:*

Be it known that I, HERVEY L. HAPPER, citizen of the United States, resident of Minneapolis, county of Hennepin, State of Minnesota, have invented certain new and useful Improvements in Meat-Roasters, of which the following is a specification.

The object of my invention is to provide a meat roaster in which strips of bacon, giblets, mushrooms, or other articles of food can be placed and thoroughly cooked without coming in direct contact with the roasting pan or the meat therein.

A further object is to provide a device in the top of the roaster which will serve as an automatic basting means, the steam from the cooking meat accumulating and mingling with the juices from the food articles contained in the basting device and flowing down upon the meat during the roasting operation.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation, partially in section, of a roaster embodying my invention, Fig. 2 is a plan view of the perforated plate that is mounted in the top of the roaster, Fig. 3 is a detail view, showing the rivets in the cover to support the perforated plate, Figs. 4 and 5 illustrate different mechanisms for securing the perforated plate when the roaster is in use.

In the drawing, 2 represents the base of the roaster and 3 the top thereof. This is the well known type of meat roaster, composed of three parts, the base, the top or cover and the roasting pan, not shown, which is placed within the base to receive the meat. It is desirable in a device of this kind to provide a means whereby articles of food, such as giblets, slices of pork or bacon, or mushrooms and the like, used for sauces, can be placed and thoroughly cooked without coming in contact with the roasting pan or the meat. It is also desirable that some means be provided for automatically basting the meat while it is being cooked.

With this end in view I preferably form a dome 4 in the top of the cover, pressing it out of the metal, if preferred, or mounting it over an opening in the cover. A plate 5 of suitable material, preferably aluminum, is mounted to form the floor between which and the dome a chamber 6 is provided. The plate 5 has a series of slots 7 therein and is adapted to receive the small articles of food to be cooked and support them above the roast in the path of the steam therefrom, without allowing them to come in direct contact with the roasting pan or with the meat. As the juices flow out of these articles of food, they will pass down through the slots 7 and fall upon and baste the meat, having previously mingled with the condensation of the steam in the chamber 6, arising from the meat. The slots 7 in the plate 5, as shown in Figs. 1 and 2, are of sufficient length and width to allow slices of bacon or pork to be inserted therein and placed upon the surface of the grate-like plate without the necessity of removing the plate from the cover. This arrangement is of particular advantage when the cover is hot, as the cook, by means of a fork, can insert slices of bacon or pork through the slots or remove them without the necessity of detaching the plate.

Various means may be provided for supporting the plate 5, such as forming key-hole slots 8 therein adapted to receive the heads of rivets 9 in the top of the cover 3. The plate may be disengaged readily from these slots by sliding it lengthwise thereon. I may also provide loops 10 mounted on the upper ends of the rivets and adapted for use in lifting the top of the roaster. These loops are preferably formed of wire and are bent slightly at one end to fit down over the rounded corner of the cover. I may also, as shown in Fig. 4, dispense with the rivets, particularly in enameled ware goods and mount levers 11 on the plate 5 having hooked ends 12 adapted to enter recesses 13 in the dome 4. The ends of these levers are preferably bent to form convenient finger grips. When the cover is inverted and the levers are pulled up, their hooked ends will be readily disengaged from the shoulders formed by the recesses in the dome. The plate 5 is preferably convex in form, so that the condensation of the steam from the cooking meat and the juices of the articles of food placed upon the plate will flow toward the middle portion thereof and down through the slots upon the meat or into the roasting pan beneath.

In Fig. 5 I have shown a modification, which consists in providing a plate 5 with a peripheral flange 12' that is adapted to snap into a groove 13' formed in the dome of the cover. A loop 14 is preferably pressed out of the plate for convenience in handling it.

This recess at the top of the roaster cover has a further function, in that in cooking a large turkey the perforated plate may be removed and the breast bone of the turkey allowed to project up into the recess, where usually it comes in contact with the cover and is dried or burnt in cooking. My improved construction provides for an increased depth from the top of the dome to the roasting pan, and adapts the roaster for cooking a large fowl or a roast of meat.

It will be observed that the roaster has an apertured basting-means support disposed centrally and in relatively close relation to the top of the cover and in spaced relation to the sides of the cover so as to leave portions of the top extending beyond the area of the basting-means support. This construction will confine the basting-means within a small area at the center or the middle portion of the cover and prevent it from sliding and packing or accumulating at the side walls of the cover in manipulation of the cover and will thus insure the basting-means being held at all times in the best possible position for the best results and so that the juices of the basting-means may drip directly on to the breast of the turkey or the middle portion of the roast contained in the pan supported by the base chamber beneath the cover. The under face of the top of the cover from the margin of the basting-means support out to the sides of the cover serves as a condensing plate so that the vapors from the roast will be condensed on the under side of the plate outside of the area of the basting-means support. The basting-means support thus occupies but a small portion of the area of the cover and at only the central portion thereof so that the juices of the meat which pass in the form of vapor into the relatively small space above the basting-means support will condense above the basting-means and keep the same moist, and the juices of the basting-means will drip directly on to the middle portion of the roast or the breast of the turkey contained in the roaster.

I have also found that the perforated plate 5 will serve to more quickly condense the steam arising from the roasting pan even though the recess above this plate may be entirely empty. This is due to the fact that the plate 5, not being directly exposed to the heat on the outside of the roaster, will be maintained at a lower temperature during the roasting operation.

I claim as my invention:—

1. A roaster comprising a base-chamber, and a cover, and an apertured basting-means support attached to the cover to be removable therewith and disposed centrally and in relatively close relation to the top of the cover and in spaced relation to the sides thereof to leave portions of the top extending beyond the area of the basting-means support.

2. A roaster comprising a base chamber and a cover having a centrally disposed dome spaced from the sides of the cover, and an apertured basting-means support disposed at the base of the dome, in spaced relation to the sides of the cover, and relatively close to the top of the cover, and means for detachably sustaining said basting-means support from the cover.

3. A roaster comprising a base-chamber and a cover having its top inclined inwardly and downwardly from its sides and formed with a centrally positioned dome or chamber rising above the lower plane of the inclined top, and an apertured basting-means support disposed at the base of the centrally disposed dome.

4. A roaster having a cover provided in its top with a centrally arranged convex portion forming a recess materially smaller in area than the cover, adapted to receive a portion of the article being roasted, that portion of the cover adjacent to the periphery of said recess being downwardly and inwardly inclined from the outer walls of the cover toward the periphery of the recess.

5. A meat roaster having a cover provided with a raised central portion or dome forming an elongated recess in the middle of the cover on the under side thereof, the outer walls of said cover being inclined inwardly and downwardly from the edge of the cover toward the periphery of said raised portion, whereby the condensation will be directed toward the middle of the cover, and a support for articles of food, such as bacon and the like, seated against said cover and having means for holding it in place beneath said dome, for the purpose specified.

In witness whereof, I have hereunto set my hand this 5th day of August, 1913.

HERVEY L. HAPPER.

Witnesses:
GENEVIEVE E. SORENSEN,
EDWARD A. PAUL.